(12) United States Patent
Pogrebinsky et al.

(10) Patent No.: US 11,394,711 B2
(45) Date of Patent: Jul. 19, 2022

(54) STREAMLINED SECURE DEPLOYMENT OF CLOUD SERVICES

(71) Applicant: Microsoft Technology Licensing, LLC, Redmond, WA (US)

(72) Inventors: Vladimir Pogrebinsky, Redmond, WA (US); Sergei Popov, Edmonds, WA (US); Alexander Wayne Eager, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 368 days.

(21) Appl. No.: 16/290,551

(22) Filed: Mar. 1, 2019

(65) Prior Publication Data

US 2020/0177591 A1   Jun. 4, 2020

Related U.S. Application Data

(60) Provisional application No. 62/772,920, filed on Nov. 29, 2018.

(51) Int. Cl.
*G06F 15/16* (2006.01)
*H04L 9/40* (2022.01)
(Continued)

(52) U.S. Cl.
CPC ............ *H04L 63/10* (2013.01); *G06F 9/5077* (2013.01); *H04L 67/1002* (2013.01)

(58) Field of Classification Search
CPC .... H04L 63/10; H04L 67/1002; G06F 9/5077
(Continued)

(56) References Cited

U.S. PATENT DOCUMENTS

| 7,496,652 B2 * | 2/2009 | Pezzutti | G06F 15/173 |
| | | | 709/219 |
| 8,504,729 B2 * | 8/2013 | Pezzutti | H04L 41/12 |
| | | | 709/219 |

(Continued)

FOREIGN PATENT DOCUMENTS

| WO | 2016010940 A1 | 1/2016 | |
| WO | 2018053072 A1 | 3/2018 | |
| WO | WO-2020112508 A1 * | 6/2020 | ............... G06F 8/61 |

OTHER PUBLICATIONS

"International Search Report and Written Opinion Issued in PCT Application No. PCT/US19/062710", dated Mar. 9, 2020, 15 Pages.
(Continued)

*Primary Examiner* — Khanh Q Dinh
(74) *Attorney, Agent, or Firm* — Newport IP, LLC; Jacob P. Rohwer

(57) ABSTRACT

Techniques for streamlined secure deployment of cloud services in cloud computing environments are disclosed herein. In one embodiment, a method can include in response to receiving an instruction to deploy a cloud service in the cloud computing system, creating a deployment subscription to resources in the cloud computing system, the deployment subscription being owned by the deployment service and instantiating one or more computing resources accessible by the deployment service in the cloud computing system in accordance with the created deployment subscription. The method also includes retrieving one or more components of an application corresponding to the cloud service based on a manifest with the instantiated one or more computing resources and installing the retrieved one or more components of the application in the cloud computing system in accordance with an installation sequence identified in the manifest.

20 Claims, 10 Drawing Sheets

(51) Int. Cl.
*G06F 9/50* (2006.01)
*H04L 67/1001* (2022.01)

(58) Field of Classification Search
USPC ............................... 709/220, 224, 226, 228
See application file for complete search history.

(56) References Cited

U.S. PATENT DOCUMENTS

| | | | |
|---|---|---|---|
| 9,015,710 B2 | 4/2015 | Spivak et al. | |
| 9,489,110 B2 | 11/2016 | Malhotra et al. | |
| 9,621,435 B2 | 4/2017 | Vasudevan et al. | |
| 10,079,876 B1* | 9/2018 | Chung | H04W 4/60 |
| 10,152,356 B2* | 12/2018 | Raikov | G06F 9/5077 |
| 10,963,565 B1* | 3/2021 | Xu | G06F 21/55 |
| 10,999,150 B2* | 5/2021 | Savov | H04L 41/12 |
| 11,080,098 B2* | 8/2021 | Raikov | H04L 67/42 |
| 2009/0238349 A1* | 9/2009 | Pezzutti | H04L 41/065 379/93.02 |
| 2014/0279201 A1 | 9/2014 | Iyoob et al. | |
| 2014/0280436 A1* | 9/2014 | Larkin | G06F 9/4843 709/201 |
| 2015/0244597 A1 | 8/2015 | Maes et al. | |
| 2015/0281398 A1 | 10/2015 | Walls et al. | |
| 2016/0212175 A1 | 7/2016 | Nagaratnam et al. | |
| 2017/0366393 A1* | 12/2017 | Shaker | H04L 67/02 |
| 2018/0157512 A1* | 6/2018 | Savov | G06F 9/5027 |
| 2018/0157538 A1* | 6/2018 | Raikov | G06F 9/45558 |
| 2019/0065277 A1* | 2/2019 | Raikov | H04L 41/0806 |
| 2019/0354411 A1* | 11/2019 | Raikov | G06F 9/455 |
| 2020/0034206 A1* | 1/2020 | Dimitrov | G06F 9/5083 |
| 2020/0036594 A1* | 1/2020 | Savov | G06F 9/5077 |
| 2020/0177591 A1* | 6/2020 | Pogrebinsky | G06F 9/5077 |

OTHER PUBLICATIONS

"Deployment Manager Fundamentals", Retrieved from: https://web.archive.org/web/20180703115151/https:/cloud.google.com/deployment-manager/docs/fundamentals, Jul. 3, 2018, 7 Pages.

* cited by examiner

STREAMLINED SECURE DEPLOYMENT OF CLOUD SERVICES

CROSS-REFERENCE TO RELATED APPLICATION(S)

This application is a non-provisional of and claims priority to U.S. Provisional Application No. 62/772,920, filed on Nov. 29, 2018, the disclosure of which is incorporated in its entirety.

BACKGROUND

Remote or "cloud" computing typically utilizes a collection of remote servers to provide computing, data storage, electronic communications, or other cloud services. A computer network can interconnect the remote servers to form a computing fabric with one or more computing clusters. During operation, multiple servers in the computing fabric can cooperate to provide a distributed computing environment that facilitates execution of user applications in order to provide desired cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud computing system can include a large number of remote servers or nodes configured to provide various cloud computing services via a computer network. Depending on access restrictions, a cloud computing system or "cloud" can be public or private. For example, a public cloud provides subscriptions of cloud services to the general public while a private cloud is only accessible by users of an organization due to security, data protection, privacy, or other concerns. Examples of public cloud include Microsoft Azure®, Amazon Web Services®, and Google Compute®. On the other hand, corporations, universities, government entities, and other organizations can often have dedicated servers, datacenters, or other computing facilities configured to deploy cloud services for internal use only. Such cloud computing systems are often referred to as a private clouds.

Public and private cloud computing systems can provide different resources, resource capabilities, features, or other operating characteristics from one another. The foregoing differences can often be dynamic due to changes in deployed versions of cloud platforms, cloud applications, service type offerings, available resource content, or resource property capabilities. For example, private clouds often operate in constrained infrastructure topologies as compared to public clouds. Thus, private clouds often provide fewer infrastructure failure domains or other computing capabilities. In another example, private clouds often do not offer a full range of infrastructure varieties such as server types, storage capacities, etc. As such, resource property capabilities such as deployable virtual machine types in the servers of a private cloud can be limited. In a further example, a private cloud may offer a subset of available application programming interface ("API") versions that are available in a public cloud. In yet another example, a particular version of a private cloud may have a different set of resources available as compared to that offered in a public cloud and that could be offered in a later version of the private cloud.

The differences between public and private clouds can cause deployment of new/updated cloud applications/services to require different deployment processes, which private cloud providers may not readily accommodate. For example, public cloud providers, for instance, Amazon.com Inc., typically has a team of developers developing applications and associated components corresponding to a cloud service. During deployment, the development team can facilitate the deployment of the cloud service by using deployment scripts for identifying, installing, debugging, and/or performing other suitable actions to the individual application components of the cloud service. Such a deployment process can thus operate satisfactorily with the support of the development team.

However, the foregoing deployment process for a public cloud may not operate satisfactorily when a private cloud provider attempts to deploy or update the same cloud service due to various resource or capability differences. Typically, private cloud providers do not have a development team dedicated to the cloud service, nor does the private cloud provider has access to the development team from the public cloud provider. As such, a complicated deployment process involving adjustment of deployment scripts, etc. tends to discourage private cloud providers from deploying new cloud services. Thus, user experience of the private cloud may be detracted.

Several embodiments of the disclosed technology are directed to streamlined secure deployment of cloud services in cloud computing systems even without access to the development teams of the cloud services. In certain implementations, the disclosed technology can provide an "appliance experience" according to which internal components associated with a deployed cloud service are kept internal and invisible to a cloud service provider. As such, implementations of cloud services (resources such as hypervisors for managing virtual machines, storage hardware services used to allocate user storage accounts, or Domain Controllers used to managing internal service identities, etc.) are treated as inner components or "guts," and kept internal and not exposed to cloud service providers.

In one example implementation, a deployment service or deployment resource provider (DRP) is provided in a cloud computing system (e.g., a public or private cloud) for deploying, updating, troubleshooting, and/or otherwise managing resources in the cloud computing system. When a new cloud service (or an update to an existing cloud service) is deposited to the DRP (e.g., from a public cloud), a deployment manifest of the new cloud service is provided to guide the DRP on deploying or updating the new cloud service. The deployment manifest can include data representing a list of application components, a list of application component updates, a sequence of installation, a configuration profile of the application components, as well as other suitable information regarding installation of the application components. The deployment manifest can be in any suitable file format, such as JavaScript Object Notation (JSON).

When activated, the DRP performs a "bootstrapping" operation by creating a new special subscription (referred to herein as a "deployment subscription") in the cloud computing system in which the new cloud service is to be deployed. Depending on the deployment manifest, the deployment subscription can be either in "consumption" or "metering" billing modes. Unlike typical subscriptions that are owned by actual users or administrators of the cloud computing system, the deployment subscription is owned by the DRP and is invisible to any actual users or administrators of the cloud computing system. Such invisibility allows the deployment subscription to be kept hidden from the users while internally providing capabilities to deploy and run the new cloud service.

Once the deployment subscription is created in the cloud computing system, based on the deployment manifest, the DRP can create an initial set of resources that are used to facilitate the deployment process. For example, the initial set of resources can include key vaults or other suitable secret storage suitable for storing credentials, virtual machines, containers (e.g., Docker containers), storage accounts, etc., that are configured to collect user-provided inputs (e.g., secrets such as passwords, etc.) for cloud service deployment. Typically, the user provided input data can include parameters such as security certificates that allow cloud services to operate in the cloud computing system. In certain implementations, the initial set of resources can have metadata that describe exact requirements (e.g., type of security certificate, etc.) that can be used to store and validate user-provided values. Another pre-deployment operation can include collecting remaining non-secret parameters, such as user preferences, etc.

After all inputs are collected, the DRP can start a deployment process. Unlike typical deployment with a development team, where team members know exact details of deployment script(s) and have ability to directly access the computing environment (e.g. for troubleshooting purposes), the DRP can be configured to perform the deployment instead of users or administrators of the cloud computing system. In one example, a user instructs the DRP to deploy a cloud service, and in response, the DRP retrieves resource manager template(s) as specified in the deployment manifest (which is signed and hidden from the users), retrieves suitable components or component updates according to the resource manager templates (e.g., from the public cloud), and deploy the retrieved components or component updates. The DRP can be configured to perform multiple operations for complex deployments, including creation and deletion of resources, calling endpoints (e.g., virtual machines), etc. In order to add new cloud services and "extend" the cloud computing system, a set of APIs (e.g., *.Provider namespace) may be implemented in the cloud computing system. Thus, exposing the users to the "guts" of the deployed cloud service can be avoided. The users can also be prevented from interfering with the content involved during deployment of the cloud service because the users have no access to such content.

Another aspect of the disclosed technology is directed to managing secrets needed to provide certain cloud services in the cloud computing system. Typically, secrets are saved in a safe location (e.g., a key vault or other suitable types of secret storage) where cloud services can access the saved secrets. However, such an approach can have multiple drawbacks. For example, giving a cloud service provider (e.g., an administrator) direct access to a safe location where secrets are stored can create an opportunity for the cloud service provider to erroneously modify or "fat-finger" one or more stored secrets. The cloud service provider may also inadvertently supply invalid secrets (wrong domains, wrong type of certificate, etc.) to the safe location. Also, some secrets have both public and private parts (e.g., public and private keys) and need to be updated in a consistent manner. Any of the foregoing problems can result in rendering a cloud service inoperable and is unacceptable for a "appliance" style operation of deploying a cloud service. In order to address at least certain aspects of such problems, the DRP can be configured to provide indirection between a cloud service provider (human) and a cloud service that consumes the secrets. DRP ensures that secrets are valid, and updated suitably for both public and private parts.

In accordance with embodiments of the disclosed technology, the foregoing deployment/update process can enable an appliance experience when deploying a cloud service in a cloud computing system. The DRP, instead of a human operator, can be configured to handle operations such as creation of one or more subscriptions, creating/updating/deleting resources, calling endpoints in the cloud computing system, executing custom scripts, transmitting various telemetry and summaries about deployment process and outcome. Deployment parameters that users provided during the deployment/update process can be cached or otherwise remembered, to avoid requesting the same input during subsequent update(s), thus eliminating or at least reducing the risk of inconsistent values provided by the users. Secret management can be configured to allow cloud service providers to view all the secrets that are in the computing system, corresponding properties (e.g., key length, creation/expiration dates, etc.), and suitably rotate them either individually or all at once or anything in-between.

DETAILED DESCRIPTION

Figure 1:
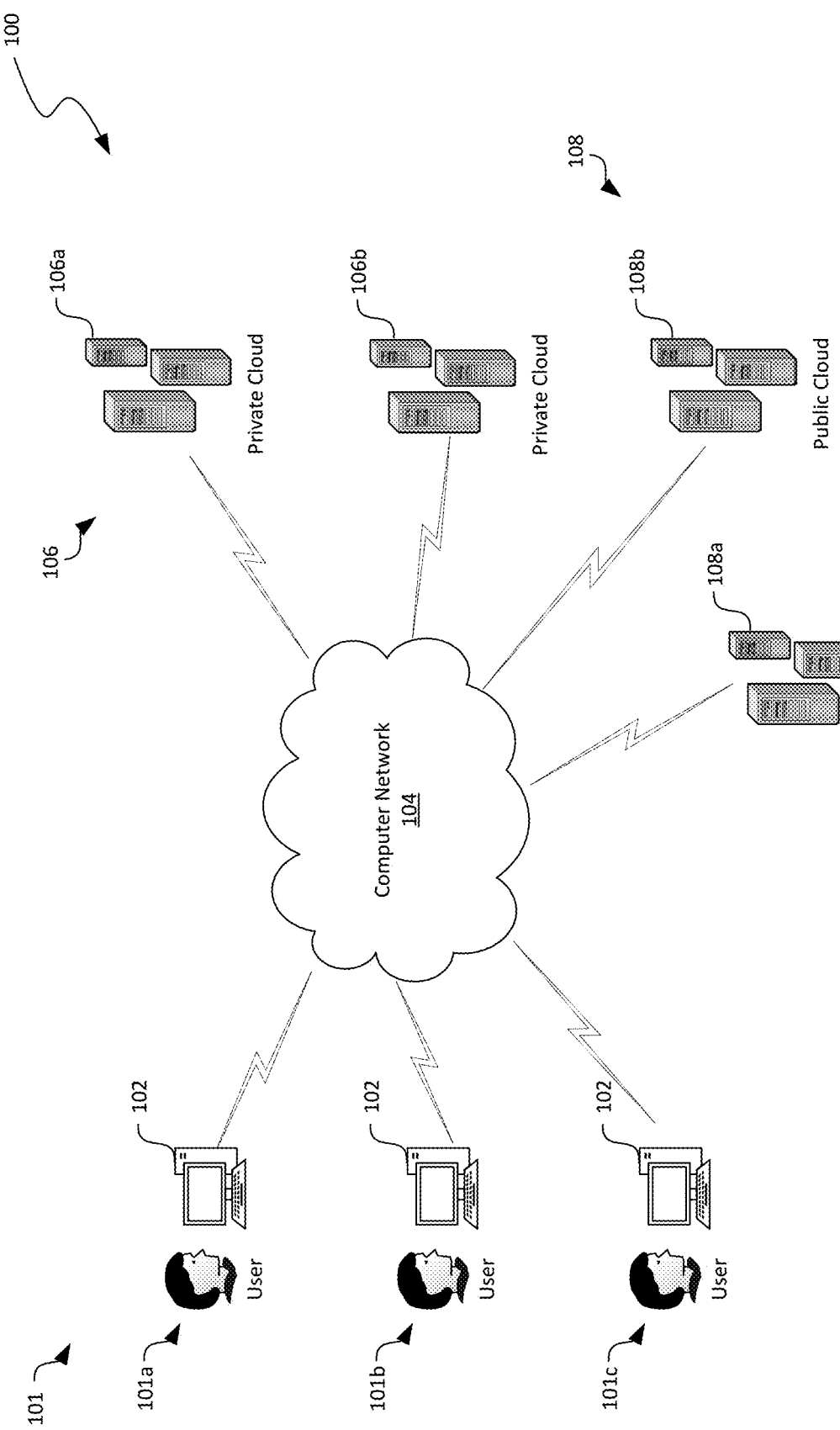
FIG. 1 is a schematic diagram of a hybrid cloud computing system in accordance with embodiments of the disclosed technology.

Certain embodiments of computing systems, devices, components, modules, routines, and processes for facilitating streamlined secure deployment of cloud services are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-6.

As used herein, the term "cloud computing system" or "cloud" generally refers to a computer system configured to provide various cloud computing services via a computer network. A cloud computing system can include multiple network devices interconnecting a large number of remote servers or nodes to one another and/or to external networks (e.g., the Internet). In one example, a cloud computing system can include multiple containers, racks, or other suitable enclosures each holding multiple servers in a cloud computing datacenter (or portions thereof). The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. For example, a node can include a computing server having a hypervisor configured to support one or more virtual machines.

As used herein, the term "public cloud" or "public cloud computing system" generally refers to a cloud computing system that provides subscriptions of cloud services to the general public. Examples of public cloud include Microsoft Azure®, Amazon Web Services®, and Google Compute®. The term "subscription" generally refers to a definition of a scope of cloud service(s) or cloud resources provided by a cloud service provider to a user. In contrast, the term "private cloud" or "private cloud computing system" generally refers to a cloud computing system for internal use of and under strict access control of an organization due to security, data protection, privacy, or other concerns. A public cloud or users outside of an organization typically do not have access to a private cloud of an organization. The term "hybrid cloud" generally refers to a cloud computing system having a portion being a first cloud (e.g., a public cloud) interconnected to another portion that is a second cloud (e.g., a private cloud). As discussed in more detail below, several embodiments of the disclosed technology can facilitate streamlined secure deployment of cloud services in public, private, and hybrid clouds.

Also used herein, the term "cloud computing service" or "cloud service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Also used herein, the term "resource provider" generally refers to a cloud service that is configured to provide or make available one or more cloud services or resources of a public or private cloud. The resources can be deployed and managed through, for example, a "resource manager" accessible via a user portal. In certain embodiments, a resource provider can be configured to offer representational state transfer ("REST") Application Programming Interfaces ("APIs") for working with associated resources. For example, a resource provider can be configured to deploy a secret storage (e.g., a key vault) for storing keys and credentials. This resource provider can provide an example resource type called "vault" for creating a key vault, and another example resource type called "vault/secret" for creating a secret in the key vault. In other embodiments, resource providers can also provide computing resources (e.g., virtual machines), storage resources (e.g., network storage), network resources (e.g., virtual networks), database resources (e.g., database servers), or other suitable types of resources.

Different cloud computing systems may offer different resources and/or capabilities to users of cloud services provided by the cloud computing systems. For some cloud computing systems, such as private clouds, deploying new or updated cloud services can be difficult due to certain levels of deployment customization as a result of particularity of resources and/or capabilities available at the cloud computing systems. As such, some cloud service providers (e.g., private cloud providers) may be discouraged from deploying new/updated cloud services in corresponding cloud computing systems. The lack of availability of new/updated cloud services may negatively impact user experience, security, privacy protection, or other suitable features of the cloud computing systems.

Several embodiments of the disclosed technology can address at least some of the foregoing drawbacks by implementing streamlined secure deployment of cloud services in cloud computing systems. In certain implementations, the disclosed technology can provide an "appliance experience" according to which internal components associated with a deployed cloud service are kept internal and invisible to a cloud service provider. As such, implementations of cloud services (resources such as hypervisors for managing virtual machines, storage hardware services used to allocate user storage accounts, or Domain Controllers used to managing internal service identities, etc.) are treated as inner components or "guts," and kept internal and not exposed to cloud service providers. Thus, complicated deployment customization can be at least reduced if not eliminated, as described in more detail below with reference to FIGS. 1-6.

FIG. 1 is a schematic diagram illustrating a cloud computing environment 100 implementing secure deployment of cloud services in accordance with embodiments of the disclosed technology. As shown in FIG. 1, the cloud computing environment 100 can include one or more public clouds 108 and private clouds 106 interconnected with client devices 102 associated with users 101 via a computer network 104. The computer network 104 can include an enterprise intranet, a wide area network, a local area network, the Internet, or other suitable types of network. One example of the computer network 104 is described in more detail below with reference to FIG. 2A.

Even though particular components and associated arrangements of the cloud computing environment 100 are shown in FIG. 1, in other embodiments, the cloud computing environment 100 can include additional and/or different components. For example, in the illustrated embodiment, the cloud computing environment 100 includes two, i.e., first and second private clouds 106a and 106b and two, i.e., first and second public clouds 108a and 108b. In other embodiments, the cloud computing environment 100 can include three, four, or any other suitable number of private clouds 106 and/or public cloud 108. In yet other embodiments, the cloud computing environment 100 can include only public clouds 108 without private clouds 106, or vice versa. In further embodiments, the cloud computing environment 100 can also include web servers, domain name servers, or other suitable components.

The client devices 102 can individually include a computing device that facilitates access to the public cloud 108 and/or the private clouds 106 via the computer network 104 by users 101. For example, in the illustrative embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the cloud computing environment 100 can facilitate any suitable number of users 101 access to the public cloud 108 and/or the private clouds 106 via the computer network 104.

The public clouds 108 and the private clouds 106 can be individually configured to provide subscriptions of certain cloud services to the users 101. As shown in FIG. 1, the public clouds 108 are open to the general public. As such, all users 101 can have access to the public clouds 108. On the other hand, the private clouds 106 can have strict access control. As such, only users 101 who are authorized may access the private clouds 106. For example, first and second users 101a and 101b can be authorized to access the first and second private clouds 106a and 106b, respectively, but not the third user 101c. As such, the third user 101c has no access to either of the first or second private cloud 106a and 106b while only having access to the public clouds 108a and 108b. Example components of a cloud computing system 110 (shown in FIG. 2A) suitable for either the public cloud 108 or the private clouds 106 are described in more detail below with reference to FIGS. 2A-2B.

As shown in FIG. 1, each of the private clouds 106 and public clouds 108 can have different resources, capabilities, or functionalities. For example, the first private cloud 106a can have an earlier version of a cloud platform than the second cloud 106b. In another example, the private clouds 106 can have constrained capabilities and/or features when compared to either the first or second public cloud 108a and 108b. In yet another example, the first and second public clouds 108a and 108b may have different capabilities or functionalities as well. Such differences can present a challenge when users 101 cloud providers (not shown) of the first and second private clouds 106a and 106b deploy new/updated cloud applications/services in the first and second private clouds 106a and 106b. As described in more detail below with reference to FIGS. 3A-3D, several embodiments of the disclosed technology can implement a secure streamlined deployment of cloud services to allow an "appliance experience" for deploying new/updated cloud services in, for example, the first and second private clouds 106a and 106b.

Figure 2A:
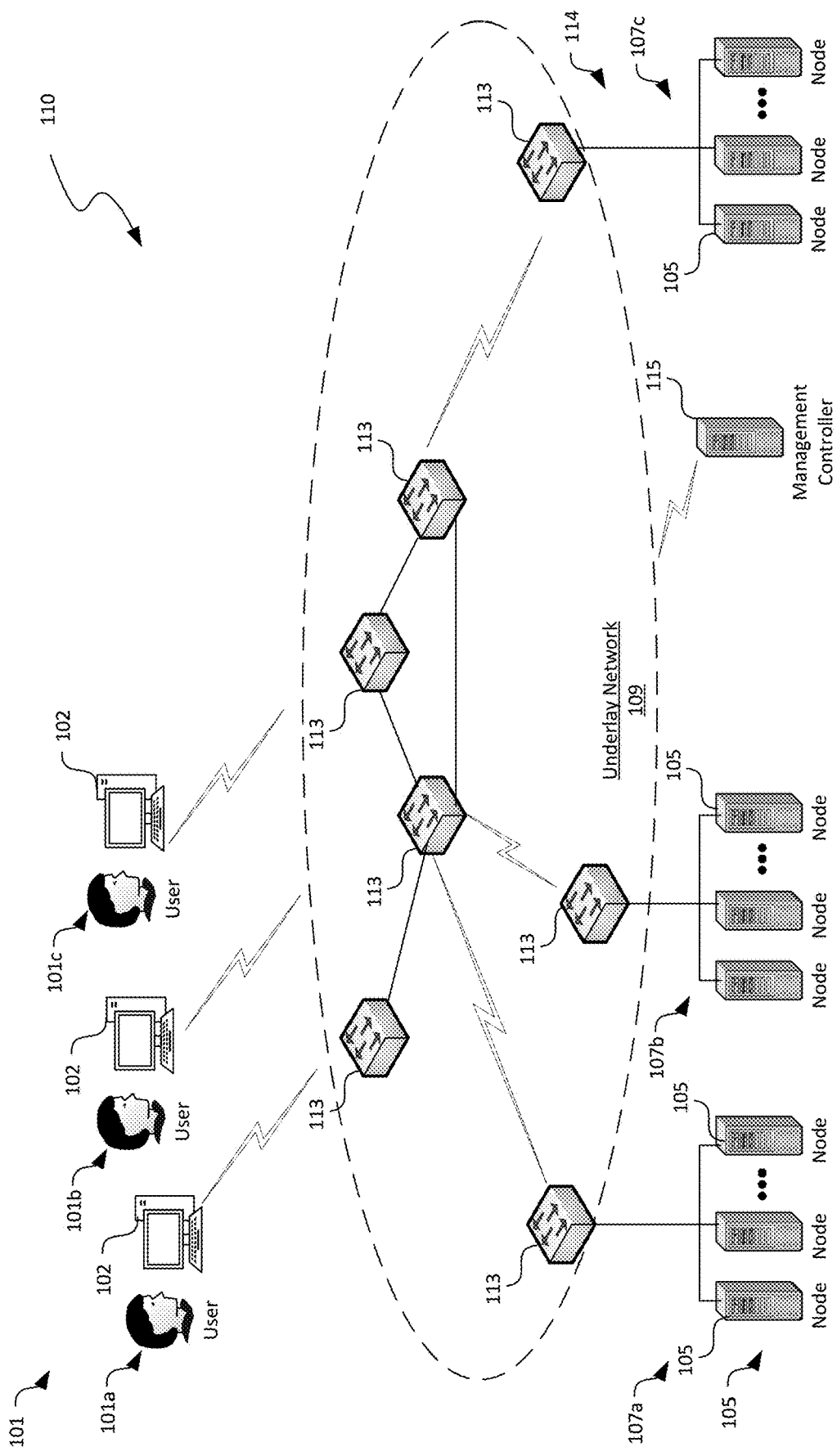
FIG. 2A is a schematic diagram illustrating a cloud computing system suitable for the hybrid cloud computing system in FIG. 1 in accordance with embodiments of the disclosed technology.

FIG. 2A is a schematic diagram illustrating a cloud computing system 110 suitable for either the public clouds 108 or the private clouds 106 of FIG. 1 in accordance with embodiments of the disclosed technology. As shown in FIG. 2A, the cloud computing system 110 can include an underlay network 109 interconnecting a plurality of the client devices 102 associated with the users 101 and a computing fabric 114. Even though particular components of the cloud computing system 110 are shown in FIG. 2A, in other embodiments, the cloud computing system 110 can also include additional and/or different constituents. For example, the cloud computing system 110 can also include additional computing fabrics (not shown) interconnected with one another, network storage devices, utility infrastructures, and/or other suitable components.

As shown in FIG. 2A, the underlay network 109 can include one or more physical network devices 113 that interconnect the users 101 and the computing fabric 114. Examples of the network devices 113 can include routers, switches, firewalls, load balancers, or other suitable network components. Even though particular connection scheme is shown in FIG. 2A for illustration purposes, in other embodiments, the network devices 113 can be operatively coupled in a hierarchical, flat, "mesh," or other suitable topologies.

As shown in FIG. 2A, the computing fabric 114 can include a plurality of nodes 105 operatively coupled to one another by the network devices 113. In certain embodiments, the nodes 105 can individually include a processor, a physical server, or several physical servers. In other embodiments, the nodes 105 can also include a virtual server or several virtual servers. The nodes 105 can be organized into racks, availability zones, groups, sets, computing clusters, or other suitable divisions. For example, in the illustrated embodiment, the nodes 105 are grouped into three computing clusters 107 (shown individually as first, second, and third computing clusters 107a-107c, respectively), which are operatively coupled to corresponding network devices 113 in the underlay network 109. Even though three computing clusters 107 are shown in FIG. 2A for illustration purposes, in other embodiments, the computing fabric 114 can include one, two, eight, sixteen, or any other suitable numbers of computing clusters 107 with similar or different components and/or configurations.

As shown in FIG. 2A, the computing fabric 114 can also include a management controller 115 configured to monitor, control, or otherwise manage operations of the nodes 105 in the computing clusters 107. For example, in certain embodiments, the management controller 115 can include a fabric controller configured to manage processing, storage, communications, or other suitable types of hardware resources in the computing clusters 107 for hosting cloud services. In other embodiments, the management controller 115 can also include a datacenter controller, application delivery controller, or other suitable types of controller. In the illustrated embodiment, the management controller 115 is shown as being separate from the computing clusters 107. In other embodiments, the management controller 115 can include one or more nodes 105 in the computing clusters 107. In further embodiments, the management controller 115 can include software services hosted on one or more of the nodes 105 in the computing clusters 107.

In operation, the users 101 can request deployment of a cloud service via, for example, a user portal (not shown). For example, a user 101 can request instantiation of a virtual machine 145 (shown in FIG. 2B). In response to receiving the request from the user 101, the management controller 115 can verify a subscription level of the user 101, and provision for instantiation of a virtual machine upon verification. The management controller 115 can then cause one or more of the nodes 105 to instantiate the requested virtual machine 145, as described in more detail below with reference to FIG. 2B.

Figure 2B:
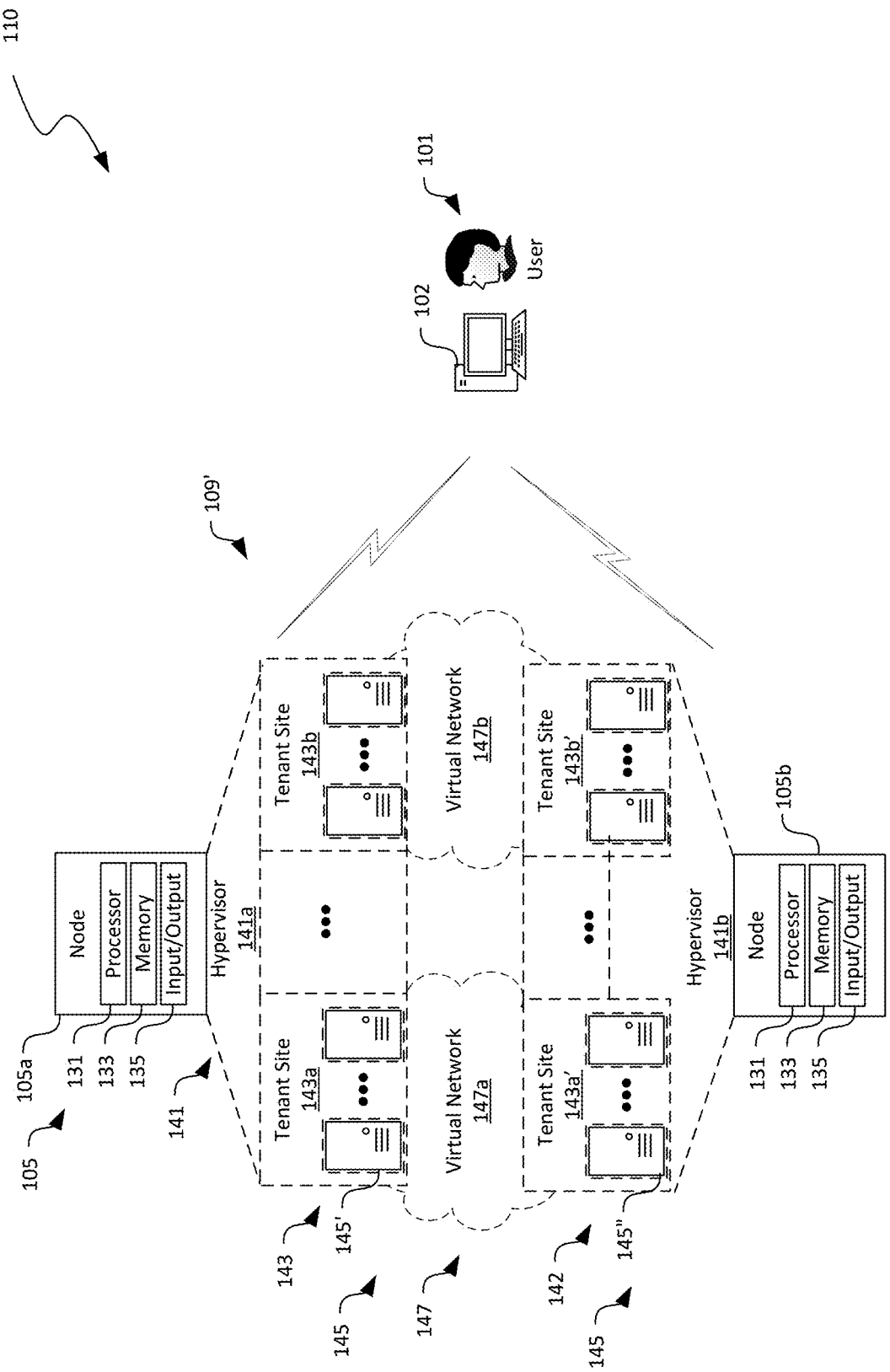
FIG. 2B is a schematic diagram illustrating certain hardware/software components of the cloud computing system in FIG. 2A in accordance with embodiments of the disclosed technology.

FIG. 2B is a schematic diagram illustrating an example overlay network 109' implemented on the underlay network 109 and suitable for the cloud computing system 110 of FIG. 2A in accordance with embodiments of the disclosed technology. In FIG. 2B, only certain components of the underlay network 109 of FIG. 2A are shown for clarity. As shown in FIG. 2B, a first node 105a and the second node 105b can each include a processor 131, a memory 133, and an input/output component 135 operatively coupled to one another. The processor 131 can include a microprocessor, a field-programmable gate array, and/or other suitable logic devices. The memory 133 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 131 (e.g., instructions for performing the methods discussed below with reference to FIGS. 6A-6D). The input/output component 135 can include a display, a touch screen, a keyboard, a mouse, a printer, and/or other suitable types of input/output devices configured to accept input from and provide output to an operator and/or an automated software controller (not shown).

The memory 133 of the first and second nodes 105a and 105b can include instructions executable by the processors 131 to cause the individual processors 131 to provide a hypervisor 141 (identified individually as first and second hypervisors 141a and 141b) and other suitable components (not shown). The hypervisors 141 can individually be configured to initiate, monitor, terminate, and/or otherwise locally manage one or more virtual machines 145 organized into tenant sites 143. For example, as shown in FIG. 2B, the first node 105a can provide a first hypervisor 141a that manages first and second tenant sites 143a and 143b, respectively. The second node 105b can provide a second hypervisor 141b that manages first and second tenant sites 143a' and 143b', respectively. The hypervisors 141 can be software, firmware, or hardware components. The tenant sites 143 can each include multiple virtual machines 145 or other suitable tenant instances for a particular user 101. For example, the first node 105a and the second node 105b can both host the tenant site 142a and 142a' for the user 101. The first node 105a and the second node 105b can both host the tenant site 143b and 143b' for the second user 101b(FIG. 1). Each virtual machine 145 can be executing a corresponding operating system, middleware, and/or applications.

Also shown in FIG. 2B, the cloud computing system 110 can include an overlay network 109' having one or more virtual networks 147 that interconnect the tenant sites 143a and 143b across multiple nodes 105. For example, a first virtual network 147a interconnects the first tenant sites 143a and 143a' at the first node 105a and the second node 105b. A second virtual network 147b interconnects the second tenant sites 143b and 143b' at the first node 105a and the second node 105b. Even though a single virtual network 147 is shown as corresponding to one tenant site 143, in other embodiments, multiple virtual networks 147 (not shown) may be configured to correspond to a single tenant site 143.

The virtual machines 145 on the virtual networks 147 can communicate with one another via the underlay network 109 (FIG. 2A) even though the virtual machines 145 are located on different nodes 105. Communications of each of the virtual networks 147 can be isolated from other virtual networks 147. In certain embodiments, communications can be allowed to cross from one virtual network 147 to another through a security gateway or otherwise in a controlled fashion. A virtual network address can correspond to one of the virtual machine 145 in a particular virtual network 147. Thus, different virtual networks 147 can use one or more virtual network addresses that are the same. Example virtual network addresses can include IP addresses, MAC addresses, and/or other suitable addresses.

In certain embodiments, the virtual machines 145 hosted on one or more of the nodes 105 can be utilized to perform one or more user requested tasks. In other embodiments, the virtual machines 145 or other suitable components of the cloud computing system 110 can also be utilized to implement an access service for the public cloud 108 (FIG. 1) or a connection service for the individual private clouds 106 (FIG. 1). The access service can be configured to provide information of available resources at the public cloud 108 to the connection service of the private cloud 106. The access service can also be configured to facilitate access to network storages in the public cloud 108 by the private clouds 106. In certain embodiments, the access service or the connection service can be individually implemented as a cloud service, for example, by executing suitable instructions or code in one or more virtual machines 145 on selected nodes 105 in the computing fabric 115 (FIG. 2A). In other embodiments, access service and/or the connection service can be provided by dedicated servers or via other suitable techniques. Even though the nodes 105 in FIG. 2B are shown as hosting virtual machines 145 for executing applications to provide suitable cloud services, in further embodiments, the nodes 105 and/or the virtual machines 145 can also host one or more containers (e.g., Docker containers, not shown), virtual switches, virtual routers, and/or other suitable components for executing the applications and/or performing other suitable operations to provide corresponding cloud services.

FIGS. 3A-3D are schematic diagrams illustrating certain hardware/software components of the cloud computing environment 100 in FIG. 1 during certain stages of streamlined secure deployment of cloud services in accordance with embodiments of the disclosed technology. In FIGS. 3A-3D, certain components of the cloud computing environment 100 are omitted for clarity. For example, only one private cloud 106 is shown in FIGS. 3A-3D for illustration purposes. Other and/or additional public and/or private clouds can have similar components and associated operations as those shown in FIGS. 3A-3D.

Even though the streamlined secure deployment technique is described below in the context of deploying a cloud service from a public cloud 108 to a private cloud 106, in other implementations, the described technique can also be applied to deploy cloud services from a publication service to a public cloud, from a public cloud to another public cloud, or from a private cloud to another private cloud. As such, embodiments of the disclosed technology are not limited to deploying cloud services from a public cloud to a private cloud.

In addition, in FIGS. 3A-3D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 3A:
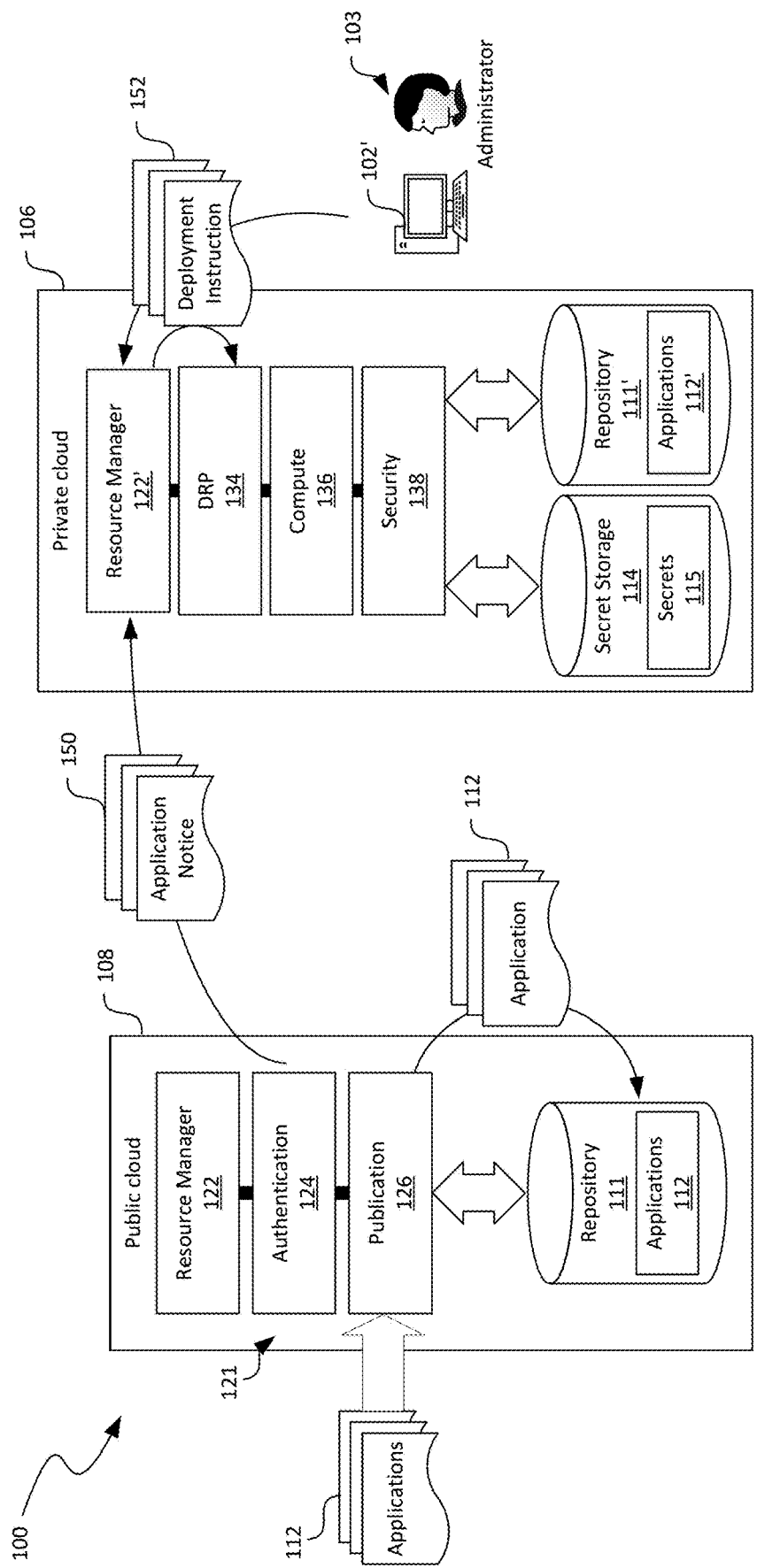
FIGS. 3A-3D are schematic diagrams illustrating certain hardware/software components of the cloud computing environment in FIG. 1 during certain stages of streamlined secure deployment of cloud services in accordance with embodiments of the disclosed technology.

As shown in FIG. 3A, the public cloud 108 can include a resource manager 122 configured to facilitate management of various resources at the public cloud 108. The public cloud 108 can also include various resource providers 121 configured to provide the various resources. For example, in the illustrated embodiment, the public cloud 108 can include an authentication service 124 and a publication service 126 operatively coupled to each another. Each of the foregoing services can be a cloud service provided by the computing fabric 114 (FIG. 2A) via execution of suitable instructions on one or more of the nodes 105 (FIG. 2A). The public cloud 108 can also include a repository 111 containing records of applications 112 individually corresponding to a cloud service. The repository 111 can include a database or other suitable network storage in the public cloud 108. Even though particular components of the public cloud 108 are shown in FIG. 3A, in other embodiments, the public cloud 108 can also include storage services, computing services, web services, database services, or other suitable types of resource providers.

The resource manager 122 can be configured to deploy, monitor, and/or manage resources in the public cloud 108 that is available to a subscriber (e.g., a user 101 in FIG. 1). The resource manager 122 can allow a subscriber to interact with available resources as a group. For example, the resource manager 122 can allow deployment, update, or deletion of one or more available resources in a coordinated operation. The resource manager 122 can also be configured to provide security, auditing, and tagging features to facilitate management of resources after deployment. Even though the public cloud 108 is shown in FIG. 3A as having the resource manager 122, in other embodiments, the resource manager 122 may be omitted. In such embodiments, a subscriber can manage various available resources in the public cloud 108 individually, separately, or in other suitable manners.

The authentication service 124 can be configured to support various authentication and authorization protocols. For example, in certain embodiments, the authentication service 124 can be configured to support single key or multi-key authentication. In other embodiments, the authentication service 124 can also be configured to support key rollover. In yet other embodiments, the authentication service 124 can also be configured to support granting limited access to HTTP or other suitable services, by orchestrating an approval interaction between a user and the services, or by allowing the user to obtain the limited access by itself. One example authentication service 124 is the Azure® Active Directory service provided by Microsoft Corporation of Redmond, Wash. In one embodiment, the authentication service 124 can be a part of a cloud computing platform of the public cloud 108. In other embodiments, the authentication service 124 can be a standalone service, application, or other suitable component.

The publication service 126 can be configured to receive applications 112 from, for example, independent software vendors (ISVs) or other suitable sources and provide access of the applications 112 to the users 101 (FIG. 1) of the public cloud 108. In certain embodiments, ISVs can develop SaaS applications and submit the developed SaaS applications to the publication service 126. In turn, the publication service 126 can be configured to validate the submitted SaaS applications to ensure compatibility with the cloud computing platform, absence of malware, or other suitable purposes. The publication service 126 can also be configured to categorize, classify, or otherwise identify one or more characteristics of the applications 112.

The publication service 126 can then be configured to store one or more copies of various components and artifacts of the applications 112 in, for example, a repository 111 or other suitable network storage (not shown) in the public cloud 108. Components of an application 112 can include executables, libraries, databases, and/or other suitable software modules. As used herein, the term "artifact" generally refers to by-products produced during development of a piece of software. For example, use cases, class diagrams, other Unified Modeling Language (UML) models, requirements, design documents, or other suitable types of artifacts can help describe function, architecture, and/or design of an application 112. Other artifacts can contain information related to a development process of the application, such as project plans, business cases, and risk assessments.

In certain embodiments, the publishing service 126 can also publish artifacts of certain applications 112 to the private cloud 106. For example, in one embodiment, when an ISV submits an application 112, the ISV can elect to have the application 112 also be published to the private cloud 106. In response to receiving the submitted application 112, the publication service 126 can then inform, for example, via an application notice 150, publish, or otherwise make the private cloud 106 aware of the submitted application 112. In other embodiments, all submitted applications 112 can be published to the private cloud 106 by default. In further embodiments, certain categories, classes, groups, or types of applications 112 can be automatically published to the private cloud 106 by default.

As shown in FIG. 3A, the private cloud 106 can include a resource manager 122', a deployment resource provider (shown as "DRP 134"), a compute service 136, and a security service 138 operatively coupled to a repository 111' and a secret storage 114. The resource manager 122' and the repository 111' can be generally similar to those of the public cloud 108. For example, the resource manager 122' can be configured to facilitate the administrator 103 to deploy, monitor, and/or manage resources in the private cloud 106 via the client device 102'. The repository 111' can be configured to store records of applications 112' published in the private cloud 106 as well as other suitable types of data in the private cloud 106.

The compute service 136 can be configured to provide computational resources to the DRP 134, the users 101, and/or other services of the private cloud 106. For example, in one embodiment, the compute service 136 can be configured to instantiate instances of a digital secret storage 114, a virtual machine, a storage account, and/or other suitable types of resources to the DRP 134 for facilitating a deployment process in the private cloud 106, as described in more detail below. The security service 138 can be configured to manage account credentials or other suitable types of secrets 115 in the secret storage 114. In certain implementations, the security service 138 can be configured to receive and verify secrets 115 provided by the administrator 103 for deploying the application 112, as described in more detail below with reference to FIGS. 3C and 3D.

The DRP 134 can be configured to streamline secure deployment of cloud services in the private cloud 106. In certain embodiments, upon receiving the application notice 150 associated with an application 122 at, for example, the resource manager 122', the administrator 103 of the private cloud 106 can elect to deploy a cloud service corresponding to the application 122 in the private cloud 106. As shown in FIG. 3A, the administrator 103 can provide a deployment instruction 152 to the resource manager 122' to activate the DRP 134 for performing a deployment process of the application 112 in the private cloud 106. In other implementations, the administrator 103 can invoke the DRP 134 directly without using the resource manager 122'.

Figure 3B:
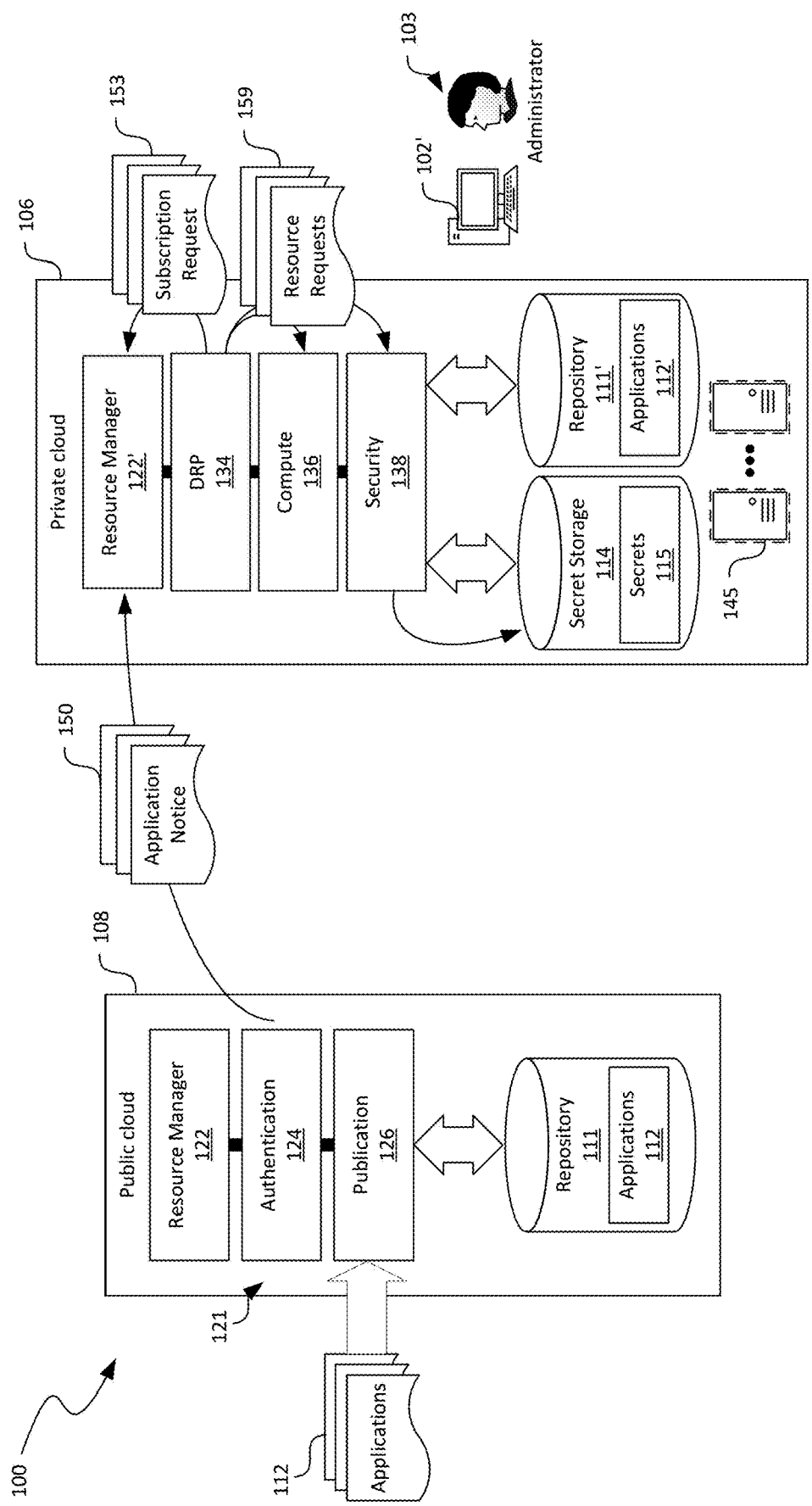

When activated, the DRP 134 can be configured to perform a "bootstrapping" operation by creating a new special subscription (referred to herein as a "deployment subscription") in the private cloud 106. In one embodiment, the DRP 134 can be configured to perform a deployment/update condition check during an initial stage. If a deployment/update condition is not met, the DRP 134 stops the deployment process. If a deployment/update condition is met, the DRP 134 can create a deployment subscription for deploying the application 112. For example, as shown in FIG. 3B, the DRP 134 can transmit a subscription request 153 to a subscription service (not shown) via the resource manager 122'. In response, the subscription service can provide an authorization to the requested deployment subscription. The authorization can identify one or more of a quantity or type of resources in the private cloud 106 accessible by the DRP 134. Unlike typical subscriptions that are owned by actual users 101 or administrators 103 of the private cloud 106, the deployment subscription is owned by the DRP 134 and is invisible to any actual users 101 or administrators 103 of the private cloud 106. Such invisibility allows the deployment subscription to be kept hidden from the users 101 while internally providing capabilities to deploy and run the new cloud service.

As shown in FIG. 3B, upon receiving the authorization for the requested deployment subscription, the DRP 134 can be configured to instantiate one or more computing resources in the private cloud 106. For example, the DRP 134 can transmit resource requests 159 to the compute service 136 to request instantiation of one or more virtual machines 145 and to the security service 138 to request instantiation of one or more key vaults 114. In other examples, the DRP 134 can also request a storage service (not shown) to instantiate a storage account, for instance, in the repository 111' or request other suitable types of services for instantiating other suitable types of resources.

Figure 3C:
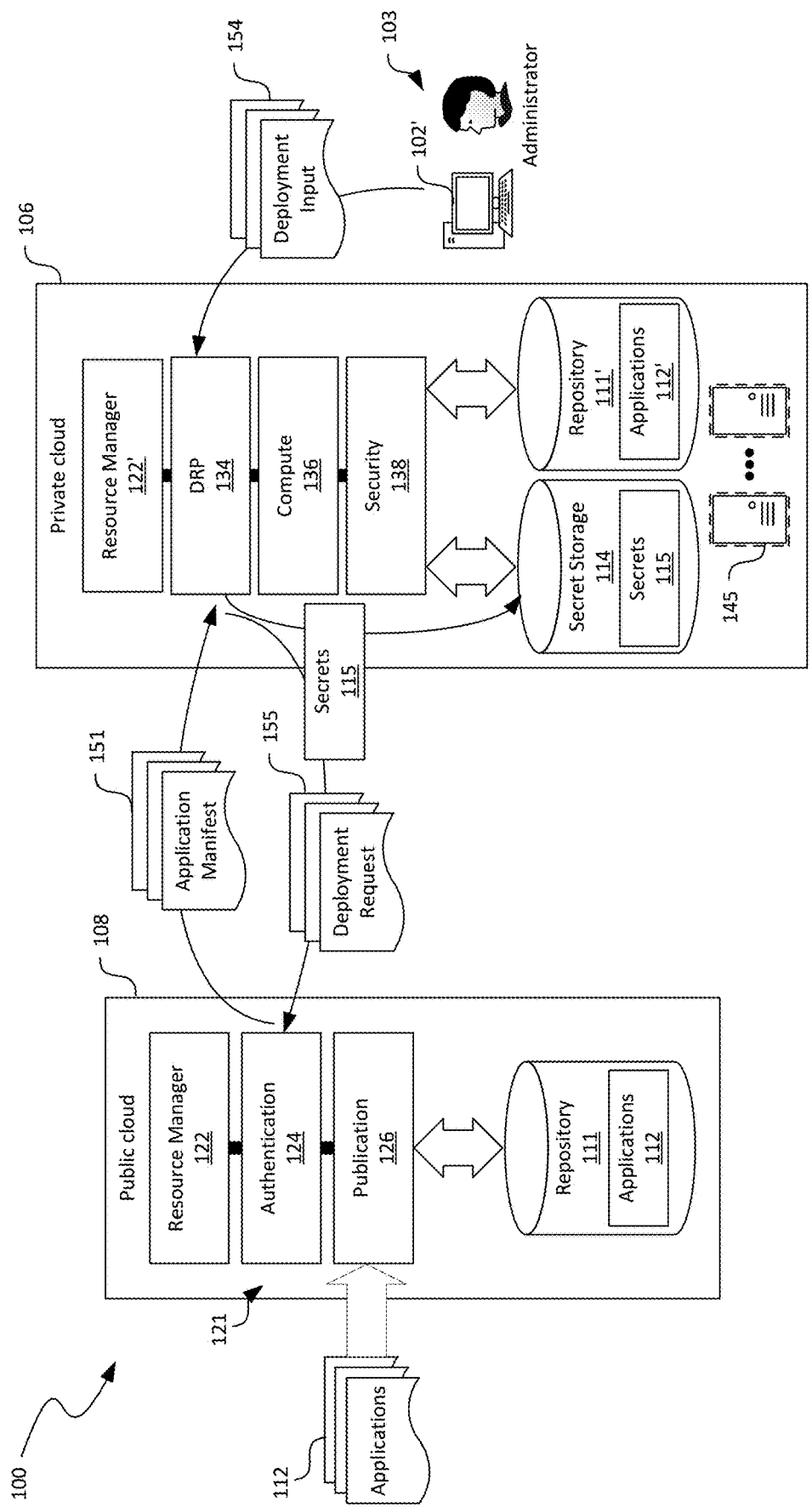

Upon instantiating the suitable resources, such as the virtual machines 145 and the secret storage 114 in the private cloud 106, the DRP 134 can be configured to collect various types of deployment input 154 from the administrator 103, as shown in FIG. 3C. In one example, the deployment input 154 can include account credentials (e.g., passwords), security certificates, and/or other suitable secrets 115 that allow the cloud service to operate in the private cloud 106. The collected secrets 115 can be stored in the instantiated secret storage 114 or other suitable locations. The deployment input 154 can also include non-secret parameters, such as user preferences, etc. Such non-secret parameters can be stored in one or more instantiated storage accounts (not shown) of the DRP 134.

In accordance with embodiments of the disclosed technology, the application 112 to be deployed in the private cloud 106 can have a corresponding application manifest 151, for instance, as an artifact of the application 112. The application manifest 151 can include data that identify one or more components of the application 112, an installation sequence of the one or more components, and/or other suitable information useful for deploying the application 112. The following is an example application manifest 151 in JSON format:

```
{
  $schema: "https://external/schemas/product-manifest/2018-07-01.json#",
  productId: "NoteProvider.1.0.0",
  deploymentConditions: {
    minimumStampVersion: "1.0.0.0"
  },
  updateConditions: {
    minimumProductVersion: "1.0.0"
  },
  deploymentDefinition: {
    subscriptionType: "Metering",
    resourceGroupName: "NoteProvider",
    bootstrapTemplate: "templates/bootstrap.json",
    mainTemplate: "templates/main.json",
    postDeploymentNotificationUriTemplate:
    "/subscriptions/{adminsubscriptionid}/
      providers/NoteProvider.Admin/
      locations/{location}/
      notifications/invoke? api-version=22018-08-01"
  },
  uiDefinition: "ui/uiDefinition.json"
}
```

The various values of the properties identified in the above example application manifest 151 are shown in the table below:

| Name | Type | Description |
|---|---|---|
| $schema | String | The product manifest schema describing product manifest content version |
| productid | String | The product identifier |
| deploymentConditions | Object | Deployment conditions |
| minimumStampVersion | String | The minimum stamp version required to install a product |
| updateConditions | Object | Update conditions |
| minimumProductVersion | String | The minimum product version required to install an update |
| deploymentDefinition | Object | Deployment process definition |
| subscriptionType | String | The target subscription type; can be "Consumption" or "Metering" |
| resourceGroupName | String | The name of the RP control plane resource groups. |
| bootstrapTemplate | String | The name of the bootstrap ARM template (see below). The file should be in the "templates" folder in the main file container |
| mainTemplate | String | The name of the main ARM template (see below). The file should be in the "templates" folder in the main file container |
| postDeployment NotificationUriTem plate | String | Optional. The URI template of post-deployment notification endpoint (see below) |
| uiDefinition | String | The name of the file containing user interface (UI) definition. The file should in the "ui" folder in the main file container. The format of UI definition is not defined yet. |

In the illustrated example in FIG. 3C, the DRP 134 is configured to retrieve the application manifest 151 from the public cloud 108 by transmitting to the public cloud 108 a deployment request 155 containing one or more secrets 115 received from the administrator 103. Upon authentication by, for instance, the authentication service 124 at the public cloud 108, the public cloud 108 provides the application manifest 151 to the DRP 134. In other examples, the application manifest 151 can be provided to the private cloud 106 along with the application notice 150 (FIG. 3A) or in other suitable manners.

In some implementations, the deployment request 155 can also include data representing a version number, a release number, a build number, and/or other suitable product/configuration parameters of a cloud platform in the private cloud 106. In one embodiment, the publication service 126 (or other suitable services) at the public cloud 108 can be configured to select a suitable product manifest 151 according to the received parameters of a cloud platform in the private cloud 106 and provide the selected product manifest 151 to the DRP 134. Different product manifests 151 may include data identifying different components, installation sequence, configuration parameters, and/or other suitable information of the application 112.

In further embodiments, the publication service 126 can be configured to generate the application manifest 151 based on the product/configuration parameters of a cloud platform in the private cloud 106 in an ad hoc or other suitable manners. For example, the publication service 126 can be configured to select a subset of available components of the application 112. In another example, the publication service 126 can be configured to alter the installation sequence of the components. In a further example, the publication service 126 can be configured to generate custom scripts to be executed in the private cloud 106 during deployment of the application 112.

In certain implementations, the application manifest 151 can also include metadata identifying one or more properties of acceptable account credentials or other suitable types of secrets 115 for deploying the cloud service. Example properties can include keyword types, keyword lengths, security key formats, etc. Based on the metadata in the application manifest 151, the security service 138 can be configured to determine whether the account credential in the collected deployment input 154 has the one or more properties of the acceptable account credentials. In response to determining that the collected deployment input 154 has the one or more properties of the acceptable account credentials, the security service 138 can store the received secrets 115 in the secret storage 114. Otherwise, the security service 138 can prompt the administrator 103 to provide updated or otherwise different deployment input 154.

Figure 3D:
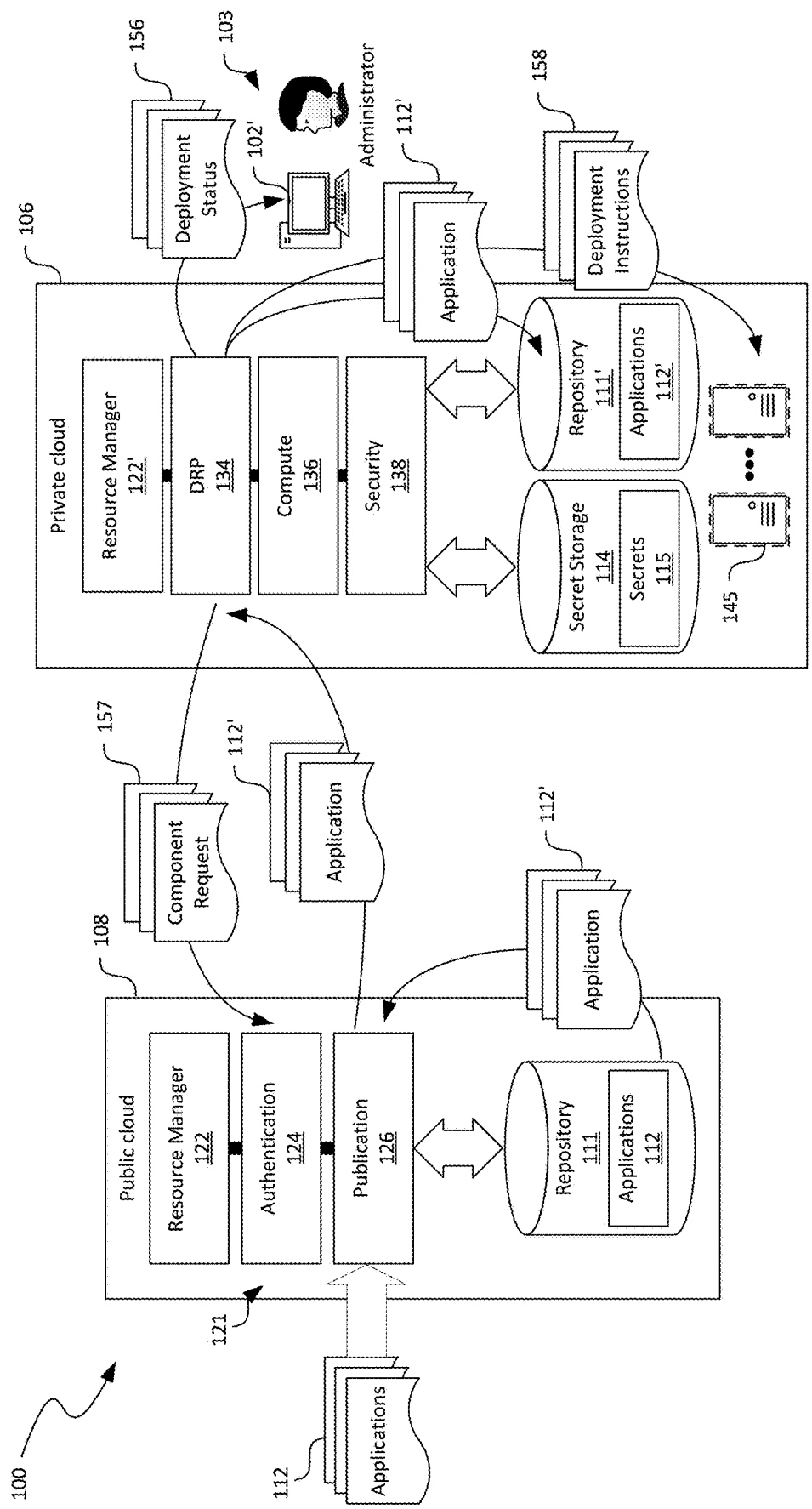

Upon receiving the application manifest 151, the DRP 134 can be configured to install components of the application 112 guided by the application manifest 151. For example, as shown in FIG. 3D, the DRP 134 can be configured to transmit one or more component request 157 to the public cloud 108 requesting the one or more components of the application 112. In response, the publication service 126 (or other suitable types of service in the public cloud 108) can be configured to retrieve a copy of the components of the application 112' and provide the retrieved copy to the DRP 134 at the private cloud 106.

Upon receiving the one or more components of the application 112', the DRP 134 can be configured to utilize the instantiate computing resources to install the one or more components in one or more servers or nodes 105 (FIG. 2A) in the private cloud 106. For example, as shown in FIG. 3D, the DRP 134 can be configured to provide deployment instructions 158 (e.g., custom scripts) to the one or more virtual machines 145. The virtual machines 145 can then execute the custom scripts to install components of the application 112 in accordance with an installation sequence identified in, for instance, the application template 151 (FIG. 3C). Such installation can include one or more of creating application directories, copying the one or more components into the application directories, creating links to additional resources in the private cloud 106, and/or other suitable operations. The one or more nodes 105 can then execute the installed one or more components of the application 112 to provide the corresponding cloud service to the users 101 (FIG. 1).

The DRP 134 can also store a copy of the one or more components of the application 112' in the repository 111' for deploying additional instances of the application 112' or other suitable purposes. During and/or upon completion of the deploying process, the DRP 134 can be configured to provide deployment status 156 to the administrator 103 via the client device 102'. The deployment status 156 can include data indicating that the application 112' has successfully deployed in the private cloud 106 or other suitable information of the deployment process.

Several embodiments of the foregoing deployment/update process can enable an appliance experience when deploying a cloud service in a cloud computing system, such as the private cloud 106. The DRP 134, instead of a human operator such as the administrator 103, can be configured to handle operations such as creation of one or more subscriptions, creating/updating/deleting resources, calling endpoints, executing custom scripts, transmitting various telemetry and summaries about deployment process and outcome. As such, the one or more components of the application 112' as well as the associated installation sequence are not exposed to the administrator 103. Also, by using the DRP 134 for accessing the secrets 115 in the secret storage 114, risks of erroneously modifying the stored secrets 115 by the administrator 103 can be reduced. Thus, the DRP 134 can provide an efficient service deployment experience to the administrator 103 to enable deploying of new and/or updated cloud services in the private cloud 106.

In addition, deployment parameters that the administrator 103 provided during the deployment/update process can be cached or otherwise remembered, to avoid requesting the same input during subsequent update(s), thus eliminating or at least reducing the risk of inconsistent values provided by the users. The security service 138 can be configured to allow the administrator 103 to view all the secrets 115 that are in the secret storage 114, corresponding properties (e.g., key length, creation/expiration dates, etc.), and suitably rotate them either individually or all at once or anything in-between.

Figure 4:
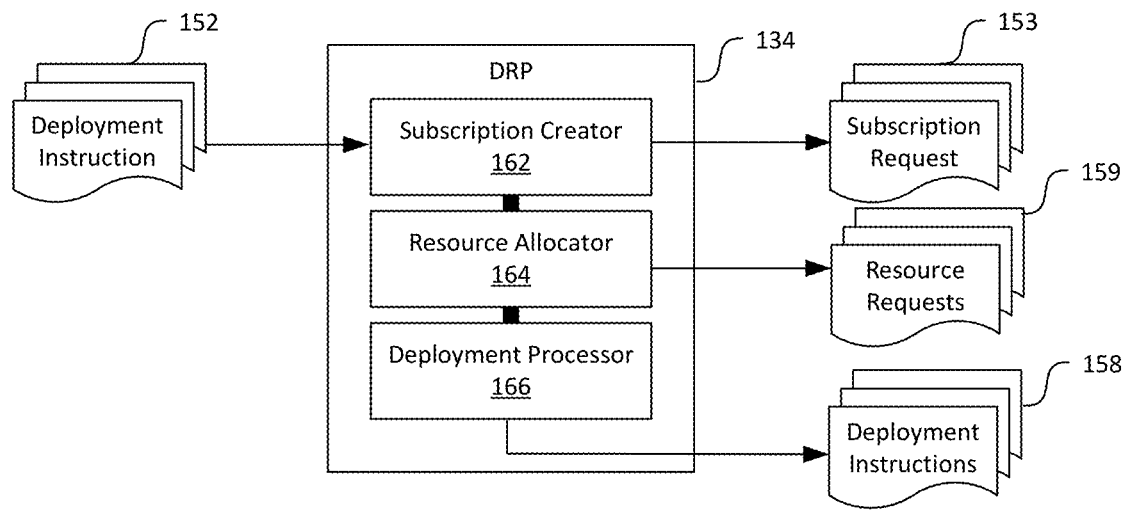
FIG. 4 is a schematic diagram illustrating certain hardware/software components of the deployment resource provider in FIGS. 3A-3D in accordance with embodiments of the disclosed technology.

FIG. 4 is a schematic diagram illustrating certain hardware/software components of the DRP 134 in FIGS. 3A-3D in accordance with embodiments of the disclosed technology. As shown in FIG. 4, the DRP 134 can include a subscription creator 162, a resource allocator 164, and a deployment processor 166 operatively coupled to one another. Even though particular components are shown in FIG. 4 for illustration purposes, in other embodiments, the DRP 134 can also include input/output or other suitable types of components.

The subscription creator 162 can be configured to create a deployment subscription in response to receiving a deployment instruction 152. For example, as described above with reference to FIG. 3A, the subscription creator 134 can be configured to generate and transmit a subscription request 153 to a subscription service in the private cloud 106 (FIG. 3A). In response, the subscription creator 162 can receive an authorization for the requested deployment subscription according to which the resource allocator 164 can be configured to instantiate one or more resources by transmitting resource requests 159. Using the instantiated resources, the deployment processor 166 can be configured to retrieve one or more components of the application 112' to be deployed in the private cloud 106 and install the one or more components of the application 112' according to an installation sequence in the application manifest 151 (FIG. 3C).

Figure 5A:
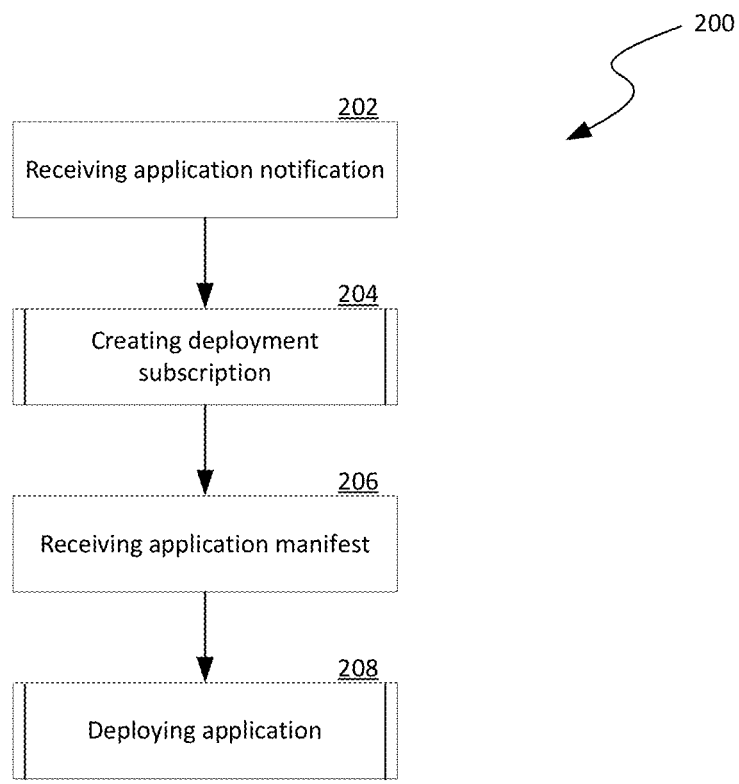
FIGS. 5A-5C are flowcharts illustrating various aspects of processes of streamlined secure deployment of cloud services in accordance with embodiments of the disclosed technology.
Figure 5B:
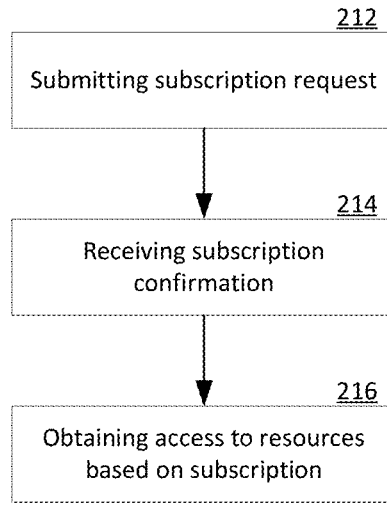
Figure 5C:
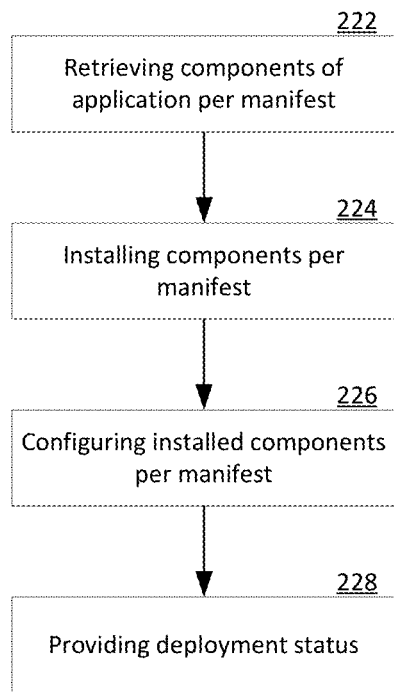

FIGS. 5A-5C are flowcharts illustrating various aspects of processes of streamlined secure deployment of cloud services in accordance with embodiments of the disclosed technology. Even though embodiments of the processes are described below in the context of the cloud computing environment 100 of FIGS. 1-3D, in other embodiments, the processes can be implemented in cloud computing environments with additional and/or different components.

As shown in FIG. 5A, a process 200 can include receiving an application notification at stage 202. In one example, the application notification can be received by a private cloud 106 (FIG. 3A) from a public cloud 108 (FIG. 3A). In other embodiments, the application notification can be received by a public cloud from a publication source, another publication, or other suitable sources. The process 200 can then include creating a deployment subscription at stage 204. As described above with reference to FIG. 3A, the deployment subscription can be owned or otherwise managed by or associated with the DRP 134 (FIG. 3A) and is invisible to the administrator 103 (FIG. 3A) or any users 101 (FIG. 1) of the private cloud 106. Example operations of creating the deployment subscription are described in more detail below with reference to FIG. 5B.

The process 200 can then include receiving an application manifest at stage 206. As described above with reference to FIG. 3C, the application manifest can include data identifying one or more components of the application 112 (FIG. 3C), an installation sequence of the one or more components, and/or other suitable installation information of the application 112. Even though receiving the application manifest is shown in FIG. 5A as subsequent to creating the deployment subscription, in other embodiments, receiving the application manifest can be before, staggered, or concurrent with creating the deployment subscription. The process 200 can then include deploying the application and corresponding cloud service in the private cloud 106 at stage 208. Example operations of deploying the application are described in more detail below with reference to FIG. 5C.

As shown in FIG. 5B, example operations of creating the deployment subscription can include submitting a subscription request at stage 212. The example operations can then include receiving a subscription confirmation at stage 214. The example operations can then include allocating or otherwise obtaining access to resources in the private cloud 106 (FIG. 3A) based on the deployment subscription. Example resources can include one or more of a secret storage, a virtual machine, a storage account, and/or other suitable types of computing resource in the private cloud 106.

As shown in FIG. 5C, example operations of deploying the application 112 (FIG. 3D) can include retrieving components of the application at stage 222 and installing the retrieved components in according with the application manifest at stage 224. The operations can further include configuring the installed components based on the application manifest at stage 226 and providing a deployment status to, for instance, the administrator 103 (FIG. 3D) at stage 228.

Figure 6:
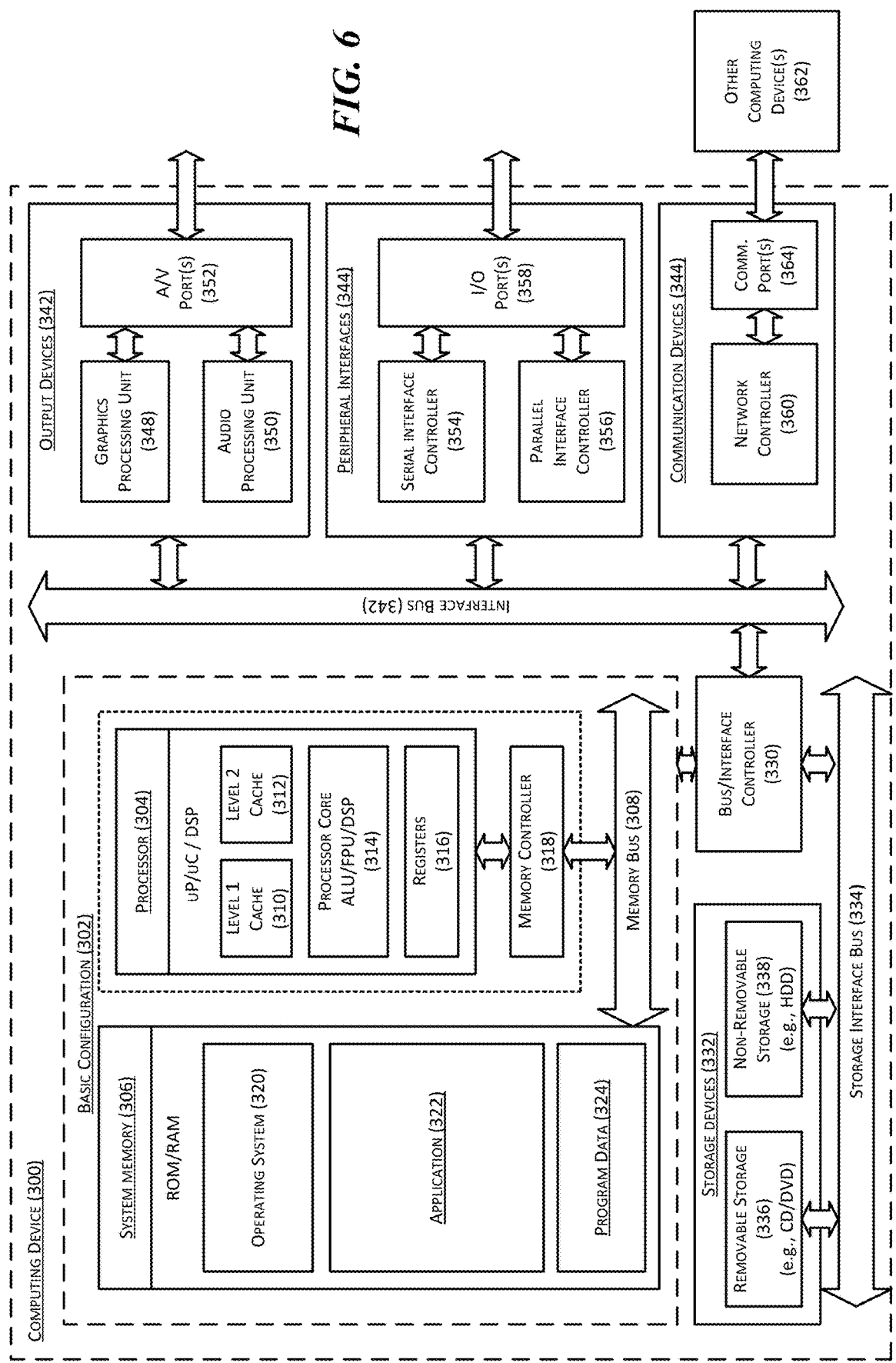
FIG. 6 is a computing device suitable for certain components of the cloud computing environment in FIG. 1.

FIG. 6 is a computing device 300 suitable for certain components of the cloud computing environment 100 in FIGS. 1-2B. For example, the computing device 300 can be suitable for the nodes 105 or the client devices 102 of FIGS. 1-2B. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it can be appreciated that specific embodiments of the disclosure have been described herein for purposes of illustration, but that various modifications can be made without deviating from the disclosure. In addition, many of the elements of one embodiment can be combined with other embodiments in addition to or in lieu of the elements of the other embodiments. Accordingly, the technology is not limited except as by the appended claims.

We claim:

1. A method for streamlined secure deployment in a cloud computing system having multiple servers executing instructions to provide a deployment service, the method comprising:
   upon receiving an instruction to deploy an application corresponding to a cloud service in the cloud computing system,
      creating a deployment subscription to resources in the cloud computing system, the deployment subscription being owned by the deployment service;
      in accordance with the created deployment subscription, instantiating one or more computing resources in the cloud computing system; and
   using the instantiated computing resources,
      retrieving one or more components of the application based on a manifest identifying the one or more components and an installation sequence of the one or more components; and
      installing the retrieved one or more components of the application in the cloud computing system in accordance with the installation sequence identified in the manifest; and
   executing, with one or more of the servers in the cloud computing system, the installed one or more components to make the cloud service available to users of the cloud computing system via the application, without exposing the one or more components of the application to the users.

2. The method of claim 1 wherein creating the subscription includes:
   transmitting, from the deployment service, a request for the deployment subscription to a resource manager of the cloud computing system; and
   receiving, from the resource manager, an authorization of the requested deployment subscription for accessing the resources in the cloud computing system, the authorization identifying one or more of a quantity or type of resources in the cloud computing system accessible by the deployment service.

3. The method of claim 1 wherein instantiating the one or more computing resources includes instantiating one or more of a secret storage, a virtual machine, or a storage account in the cloud computing system, the secret storage, the virtual machine, a container, or the storage account being accessible only by the deployment service without being accessible by an administrator or user of the cloud computing system.

4. The method of claim 1 wherein:
   instantiating the one or more computing resources includes instantiating one or more of a virtual machine or a container; and
   using the instantiated computing resources includes, with the deployment service, instructing the instantiated virtual machine or container to retrieve the one or more components of the application and install or update the retrieved one or more components of the application in the cloud computing system according to the installation sequence.

5. The method of claim 1, further comprising:
   using the instantiated computing resources to collect an account credential from an administrator of the cloud computing system; and
   wherein retrieving the one or more components of an application includes retrieving the one or more components of an application using the collected account credential from the administrator.

6. The method of claim 1 wherein:
   the manifest includes metadata identifying a property of acceptable account credentials for deploying the cloud service;
   instantiating the one or more computing resources includes instantiating a secret storage;
   using the instantiated computing resources further includes using the instantiated computing resources to collect input from an administrator of the cloud computing system, the collected input including an account credential; and the method further includes:
    determining whether the account credential in the collected input has the property of the acceptable account credentials; and
    in response to determining that the account credential in the collected input has the property of the acceptable account credentials, storing the account credential in the collected input in the instantiated secret storage.

7. The method of claim 1 wherein:
the manifest includes metadata identifying a property of acceptable account credentials for deploying the cloud service;
instantiating the one or more computing resources includes instantiating a secret storage;
using the instantiated computing resources further includes using the instantiated computing resources to collect input from an administrator of the cloud computing system, the collected input including an account credential; and
the method further includes:
    determining whether the account credential in the collected input has the property of the acceptable account credentials; and
    in response to determining that the account credential in the collected input does not have the property of the acceptable account credentials, prompting the administrator to re-enter the account credential.

8. The method of claim 1 wherein:
instantiating the one or more computing resources includes instantiating a virtual machine and a secret storage in the cloud computing system;
using the instantiated computing resources includes using the instantiated computing resources to collect account credential from an administrator of the cloud computing system; and
the method further includes:
    storing the collected account credential from the administrator in the instantiated secret storage; and
    using the stored account credential in the secret storage when deploying another cloud service in the cloud computing system in lieu of collecting the account credential from the administrator.

9. The method of claim 1 wherein:
the cloud computing system is a private cloud; and
the method further includes:
    receiving, from a public cloud, a notification indicating that the cloud service is available for deployment or update in the private cloud; and
    in response to receiving the notification, providing the instruction to the deployment service to deploy or update the cloud service in the cloud computing system.

10. A computing device in a cloud computing system having multiple servers, the computing device comprising:
a processor; and
a memory operatively coupled to the processor, the memory containing instructions executable by the processor to provide a deployment service and additional instructions executable by the processor to cause the computing device to:
    upon receiving an instruction to update an application corresponding to a cloud service in the cloud computing system, create a deployment subscription owned by the deployment service to resources in the cloud computing system and in accordance with the created deployment subscription, instantiate one or more computing resources in the cloud computing system; and
    use the instantiated computing resources to,
        retrieve one or more updated components of the application based on a manifest identifying the one or more updated components and an installation sequence of the one or more updated components of the application; and
        update one or more corresponding components of the application in the cloud computing system with the retrieved one or more updated components in accordance with the installation sequence identified in the manifest, thereby allowing the cloud service to be available to users of the cloud computing system via the application, without exposing the one or more updated components of the application to the users.

11. The computing device of claim 10 wherein to create the subscription includes to:
transmit, from the deployment service, a request for the deployment subscription to a resource manager of the cloud computing system; and
receive, from the resource manager, an authorization of the requested deployment subscription for accessing the resources in the cloud computing system, the authorization identifying one or more of a quantity or type of resources in the cloud computing system accessible by the deployment service.

12. The computing device of claim 10 wherein to instantiate the one or more computing resources includes to instantiate one or more of a secret storage, a virtual machine, a container, or a storage account in the cloud computing system, the secret storage, the virtual machine, the container, or the storage account being accessible only by the deployment service without being accessible by an administrator or user of the cloud computing system.

13. The computing device of claim 10 wherein:
to instantiate the one or more computing resources includes to instantiate one or more of a virtual machine or a container; and
to use the instantiated computing resources includes, with the deployment service, to instruct the instantiated virtual machine or container to retrieve the one or more updated components of the application and install the retrieved one or more updated components of the application in the cloud computing system according to the installation sequence.

14. The computing device of claim 10 wherein the memory includes further instructions executable by the processor to cause the computing device to:
collect an account credential from an administrator of the cloud computing system; and
wherein to retrieve the one or more updated components of an application includes to retrieve the one or more updated components of an application using the collected account credential from the administrator.

15. The computing device of claim 10 wherein:
the manifest includes metadata identifying a property of acceptable account credentials for deploying the cloud service;
to instantiate the one or more computing resources includes to instantiate a secret storage; and
the memory includes further instructions executable by the processor to cause the computing device to:

collect input from an administrator of the cloud computing system, the collected input including an account credential;

determine whether the account credential in the collected input has the property of the acceptable account credentials; and in response to determining that the account credential in the collected input has the property of the acceptable account credentials, store the account credential in the collected input in the instantiated secret storage.

16. The computing device of claim 10 wherein:

the manifest includes metadata identifying a property of acceptable account credentials for deploying the cloud service;

to instantiate the one or more computing resources includes to instantiate a secret storage; and the memory includes further instructions executable by the processor to cause the computing device to:

collect input from an administrator of the cloud computing system, the collected input including an account credential;

determine whether the account credential in the collected input has the property of the acceptable account credentials; and in response to determining that the account credential in the collected input does not have the property of the acceptable account credentials, prompt the administrator to re-enter the account credential.

17. A method for streamlined secure deployment in a cloud computing system having multiple servers executing instructions to provide a deployment service, the method comprising:

receiving, at the deployment service, an instruction to deploy an application corresponding to a cloud service in the cloud computing system, the cloud service corresponding to an application with one or more components identified by a manifest; and in response to receiving the instruction, creating a deployment subscription to resources in the cloud computing system, the deployment subscription being owned by the deployment service;

instantiating one or more computing resources accessible by the deployment service in the cloud computing system in accordance with the created deployment subscription;

retrieving one or more components of the application based on the manifest with the instantiated one or more computing resources; and installing the retrieved one or more components of the application in the cloud computing system in accordance with an installation sequence identified in the manifest, thereby making the cloud service available to users of the cloud computing system via the application, without exposing the one or more components of the application to the users.

18. The method of claim 17 wherein instantiating the one or more computing resources includes instantiating one or more of a secret storage, a virtual machine, or a storage account in the cloud computing system, the secret storage, the virtual machine, or the storage account being accessible only by the deployment service without being accessible by an administrator or user of the cloud computing system.

19. The method of claim 17 wherein:

the manifest includes metadata identifying a property of acceptable account credentials for deploying the cloud service;

instantiating the one or more computing resources includes instantiating a secret storage; and the method further includes:

collecting input from an administrator of the cloud computing system, the collected input including an account credential;

determining whether the account credential in the collected input has the property of the acceptable account credentials; and in response to determining that the account credential in the collected input does not have the property of the acceptable account credentials, prompting the administrator to re-enter the account credential.

20. The method of claim 17 wherein:

instantiating the one or more computing resources includes instantiating a virtual machine and a secret storage in the cloud computing system; and the method further includes:

collecting account credential from an administrator of the cloud computing system;

storing the collected account credential from the administrator in the instantiated secret storage; and using the stored account credential in the secret storage when deploying another cloud service in the cloud computing system in lieu of collecting the account credential from the administrator.

\* \* \* \* \*